United States Patent
Taketani (10) Patent No.: US 6,188,445 B1
(45) Date of Patent: Feb. 13, 2001

(54) LUMINANCE SIGNAL AND CHROMINANCE SIGNAL CORRELATION DETECTION AND SEPARATION CIRCUIT

(75) Inventor: Nobuo Taketani, Hyogo (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/260,358

(22) Filed: Mar. 1, 1999

(30) Foreign Application Priority Data

Feb. 27, 1998 (JP) .................................................. 10-046942
Mar. 13, 1998 (JP) .................................................. 10-062836

(51) Int. Cl.[7] ...................................................... H04N 9/77
(52) U.S. Cl. ............................................. 348/663; 348/664
(58) Field of Search ..................................... 348/663–665; H04N 9/77

(56) References Cited

U.S. PATENT DOCUMENTS 5,335,021 * 8/1994 Sawada ................................ 348/664
5,959,695 * 9/1999 Sugimoto et al. ................... 348/664
5,969,771 * 10/1999 Sugimoto et al. ................... 348/663

FOREIGN PATENT DOCUMENTS 0 322 890 B1   7/1989   (EP) .
0 802 687 A1  10/1997   (EP) .
0 849 957 A2   6/1998   (EP) .
0035683 *      2/1991   (JP) ................................ H04N/9/77
4-150595       5/1992   (JP) .
9-37291        2/1997   (JP) .

OTHER PUBLICATIONS

Japanese Search Report, application No. PCT/JP99/00912, dated Jun. 21,1999.

* cited by examiner

Primary Examiner—Victor R. Kostak
(74) Attorney, Agent, or Firm—Ratner & Prestia (57) ABSTRACT

In a signal processing circuit for separating a color video signal into a luminance signal and a chrominance signal, whether the correlation relating to the high frequency component of luminance signal and chrominance signal of color video input signal is high or low before and after one horizontal scanning period is detected by a vertical correlation detecting circuit, and the presence or absence of correlation of the detected output signal in the horizontal scanning line is detected by a horizontal correlation detecting circuit. The output signal of the horizontal correlation detecting circuit before and after one horizontal scanning period is supplied into a logic circuit, and depending on the gate output signal obtained therein, the high frequency component of luminance signal and chrominance signal before and after one horizontal scanning period are processed in an operation processing circuit, and a chrominance signal is delivered. Furthermore, this chrominance signal can be obtained through a variable filter circuit capable of changing over the band pass characteristic depending on the output signal of the logic circuit.

8 Claims, 6 Drawing Sheets

| Output signal of horizontal correlation detecting circuit 105 | Output signal of hdl 106 | Output signal of operation processing circuit 108 |
|---|---|---|
| L | L | Signal by reducing the difference between output signal of BPF 102 and output signal of BPF 103 to 1/2 is issued |
| L | H | Output signal of 102 is directly issued |
| H | L | Signal by reducing the difference between output signal of BPF 102 and output signal of BPF 103 to 1/2 is issued |
| H | H | Signal by reducing the difference between output signal of BPF 102 and output signal of BPF 103 to 1/2 is issued |

FIG. 6 PRIOR ART

LUMINANCE SIGNAL AND CHROMINANCE SIGNAL CORRELATION DETECTION AND SEPARATION CIRCUIT

TECHNICAL FIELD OF THE INVENTION

The present invention relates to a luminance signal and chrominance signal separating circuit for separating composite color video signal of NTSC color television system into luminance signal and chrominance signal.

BACKGROUND ART

A composite video signal of NTSC system is composed by superposing a chrominance signal on a luminance signal in an interleaving relation. It hence requires a process of separating the two signals, but if a chrominance signal component is mixed in the separated luminance signal, it appears as dot interference (caused by chrominance signal) on the screen, or if a luminance signal component is mixed in the chrominance signal, it results in cross color interference, and it is therefore ideal to separate them without causing such mixing. As a method of separating, recently, it is the mainstream to separate by a comb filter using a 1H (H being a horizontal scanning period) delay circuit.

Figure 6:
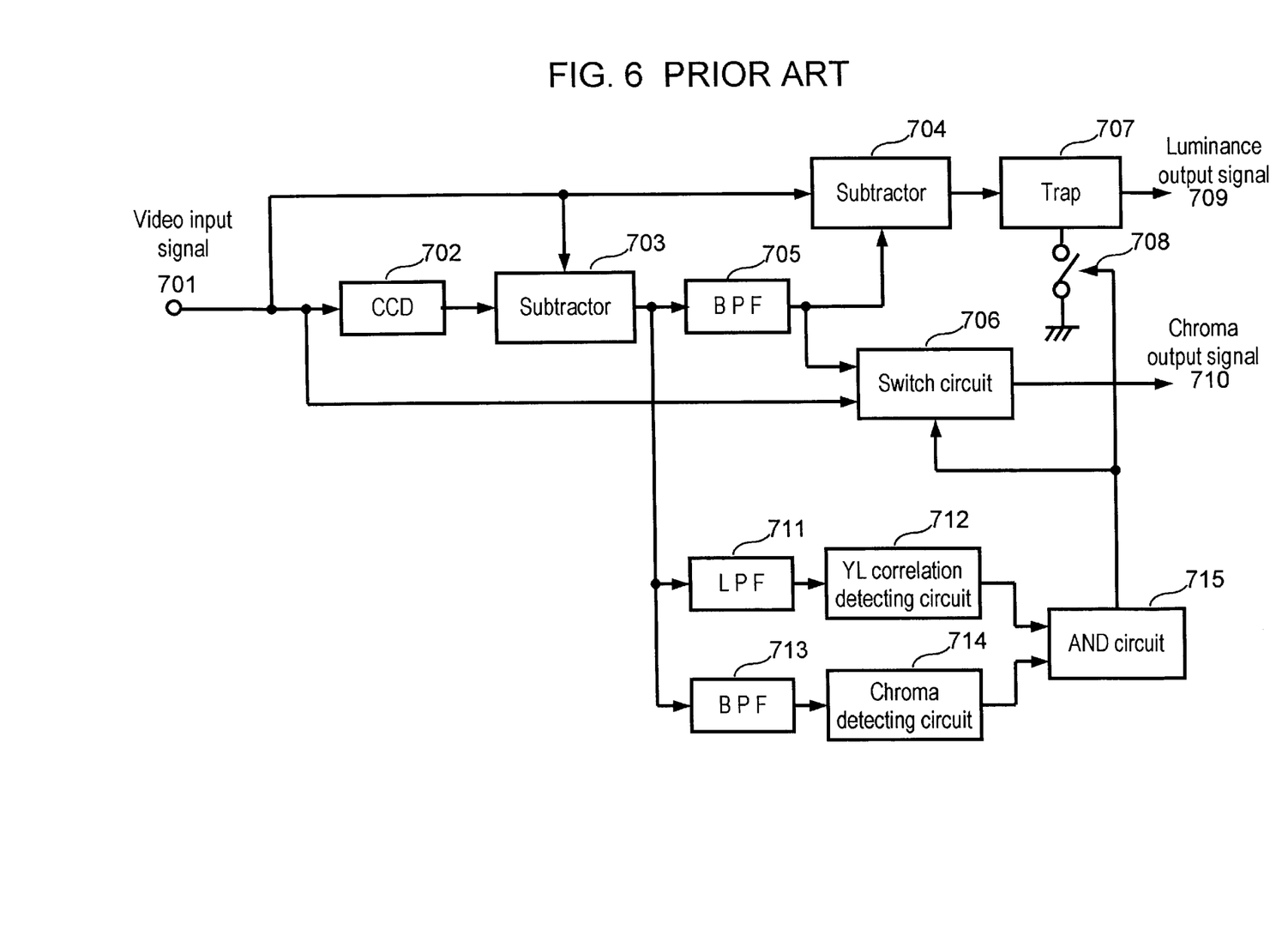
FIG. 6 is a block diagram of a conventional example explaining a prior art.

FIG. 6 is a schematic diagram showing an example of signal processing circuit for separating a composite video signal of a conventional NTSC color television system into luminance signal and chrominance signal (hereinafter called Y/C separation). In FIG. 6, a video signal 701 is entered, and is fed into a 1H delay circuit CCD HDL 702 of CCD (charge coupled device), and is delayed by a horizontal scanning period, and the 1H delayed signal is delivered from the 1H delay circuit 702 into a subtractor 703. In the subtractor 703, the input video signal 701 is also supplied, it is subtracted in relation to the 1H delayed signal. As known well, since the chrominance signal is inverted in phase, according to the principle of interleaving, in every adjacent scanning line, and therefore if the video signal has correlation between lines, the luminance signals are mutually canceled by the subtraction process, and the component of chrominance signal is separated as the output signal of the subtractor 703.

On the other hand, the input video signal 701 is also supplied into a subtractor 704. The subtractor 704 is also provided with a chrominance signal obtained by passing the output signal of the subtractor 703 through a band pass filter circuit BPF 705, and therefore by subtracting this chrominance signal from the video signal 701, only the luminance signal is separated and obtained.

This operating function is the principle of separation of luminance signal and chrominance signal by the known comb filter. However, since perfect separation is impossible in the position not having correlation between signals (between lines) before and after 1H, dot interference or cross color interference may occur. Accordingly, by detecting a signal not separated in a comb filter circuit, it is attempted to process so as to decrease such interference.

That is, in the prior art in FIG. 6, the output signal of the subtractor 703 is supplied into a low pass filter LPF 711 and a band pass filter BPF 713, and a luminance signal component of lower frequency than the chrominance signal component is taken out from the LPF 711, and a chrominance signal component is taken out from the BPF 713. If there is no correlation in signal between lines, the luminance signal component is issued through the LPF 711, and is put into a YL correlation detecting circuit 712, and a signal showing absence of correlation is issued from the YL correlation detecting circuit 712.

On the other hand, if the entered video signal has a chrominance signal, a chrominance signal component is issued from the BPF 713, and is put into a chrominance detecting circuit 714. This chrominance detecting circuit, if the chrominance signal component is entered, issues a signal showing its detection.

Between thus obtained no-correlation detection signal and the detection signal of chrominance signal, the AND (logical operation) is calculated in an AND circuit 715. By the output signal of the AND circuit 715, switch operations of trap circuit 707 and switch circuit 706 are controlled.

That is, if there is no correlation in signal between lines and a chrominance signal is present, a switch 708 of the trap circuit is closed, and the chrominance signal component superposed on the luminance signal is removed by the trap effect, so that the dot interference is lessened. At this time, the switch circuit 706 operates so that a chrominance signal may be directly obtained from the video input signal 701.

However, since the chrominance signal is detected directly from the signal obtained from the output signal of the subtractor 703 in FIG. 6 through the BPF 713, if there is no correlation between lines, a luminance signal component is present in the output signal of the subtractor 703, and hence the precision of chrominance signal detection is lowered. Accordingly, depending on the pattern of the image, the Y/C separation may not be realized at high precision.

To enhance the precision further, in a prior art, for example, the luminance signal obtained in the comb filter circuit is passed again through other comb filter circuit, and presence or absence of chrominance signal component contained in the luminance signal is detected (not shown in a drawing). In this case, however, one more 1H delay circuit for color video signal is needed, and the cost is increased.

If there is no correlation in signal between lines, as mentioned above, since a luminance signal component is contained in the chrominance signal obtained from the output signal of the subtractor 703 in FIG. 6, it is passed through the band pass filter circuit BPF 705, and the cross color interference is lessened. Although such filter circuit can lessen the cross color interference in the narrower band characteristic, the transient characteristic of chrominance signal is impaired, and the response of chrominance signal is sacrificed in the signal high in correlation between lines and free from cross color interference.

DISCLOSURE OF THE INVENTION

The invention is intended to process signal in order to solve the above problems more specifically, and presents a luminance signal and chrominance signal separating circuit for separating color video signal into luminance signal and chrominance signal in a circuit system comprising a first band pass filter for obtaining a first signal by passing a predetermined band width of a color video signal through said first band pass filter, a first 1H delay circuit for delaying said color video signal by one horizontal scanning period and a second band pass filter for obtaining a second signal by receiving the output signal from said first 1H delay circuit and passing said predetermined band width of the delayed color signal, thereby taking out a chrominance signal from said first signal and second signal.

In the above-explained circuit system, a first aspect of the invention is characterized in that it comprises:

a correlation detecting circuit for detecting the correlation between said first signal and second signal;

a second 1H delay circuit for delaying the output signal from said correlation detecting circuit by one horizontal scanning period;

a first logic circuit for receiving the output signal from said correlation detecting circuit and the output signal from said second 1H delay circuit, and performing a logical operation; and an operation processing circuit for receiving said first signal and second signal, and taking out a chrominance signal from the difference between said first signal and second signal or from the first signal only, depending on the output signal of said first logic circuit.

According to the invention, whether the color video signal has a correlation before and after one horizontal scanning period, or not having correlation, by detecting the absence of correlation at high precision, the signal processing circuit capable of separating into luminance signal and chrominance signal can be presented.

The second aspect of the invention is characterized in that the correlation detecting circuit described in the first aspect comprises:

a vertical correlation detecting circuit for detecting the vertical correlation of said first signal and second signal; and a horizontal correlation detecting circuit for receiving the output signal from said vertical correlation detecting circuit, detecting the correlation in the horizontal scanning period of the entered signal, and outputting to said second 1H delay circuit.

The third aspect of the invention is characterized in further comprising to the first aspect:

a second logic circuit for receiving the output signal from said correlation detecting circuit and the output signal from said second 1H delay circuit, and performing a logical operation; and a variable filter for receiving the output signal from said operation processing circuit and changing over the band passing characteristic depending on the output signal of said second logic circuit.

According to this aspect, same as in the invention as set forth in the first aspect, if there is no correlation in the color video signal between lines, absence of correlation can be detected at high precision, and in the absence of correlation, the separated chrominance signal is passed into the band pass filter circuit of narrow band, and the cross color interference on the screen is reduced, and if the correlation is high, by passing into the band pass filter circuit of wide band, deterioration of transient characteristic of chrominance signal can be prevented.

The fourth aspect of the invention is characterized in that the vertical correlation detecting circuit of the second aspect comprises:

a first adder for summing up said first signal and second signal; and a comparator for comparing the output signal of said first adder and a reference signal, and outputting the result of comparison.

The fifth aspect of the invention is characterized in that the horizontal correlation detecting circuit of the second aspect judges as the presence of horizontal correlation when a plurality of signals, which are outputted from said vertical correlation circuit changed by time TL corresponding to half wavelength of color subcarrier, continuously correlate to each other.

The sixth aspect is characterized in that the horizontal correlation detecting circuit of the fifth aspect comprises:

a first delay circuit for receiving the output signal from said vertical correlation detecting circuit, and delaying by said time TL;

a second to m-th delay circuit and a (m+1)-th to n-th delay circuit connected to said first delay circuit in series for delaying the output signal of delay circuit by said time TL, respectively;

a first multi-input AND gate circuit for receiving the output signals of said first delay circuit to m-th delay circuit;

a second multi-input AND gate circuit for receiving the output signals of said (m+1)-th to n-th delay circuit; and an OR gate circuit for receiving the output signal of said first multi-input AND gate circuit and the output signal of said second multi-input AND gate circuit.

The seventh aspect is characterized in that the operation processing circuit of the first aspect comprises:

a phase inverting circuit for inverting the phase of output signal of said second band pass filter;

a first changeover circuit for receiving the output signal of said phase inverting circuit and the output signal of said first band pass filter as input signals, and selecting and taking out either signal of said input signals by the output of said first logic circuit;

a second adder for adding the output signal from said first changeover circuit and the output signal from said first band pass filter; and an amplitude adjusting circuit for reducing the output signal of said second adder circuit to ½.

The eighth aspect is characterized in that the first logic circuit of the first aspect is formed of an AND gate circuit having an input terminal of negative logic at a first end and an ordinary input terminal of positive logic at a second end, and the output signal of said correlation detecting circuit is supplied into said input terminal of negative logic, and the output of said second 1H delay circuit is supplied into the input terminal of positive logic.

The ninth aspect is characterized in that the variable filter of the third aspect comprises:

a band pass filter of narrow band;

a band pass filter of wide band having a wider band than the narrow band; and a second changeover circuit for changing over and issuing either one of the output signal of said band pass filter of narrow band or the output signal of said band pass filter of wider band, by the output signal of said second logic circuit.

According to this aspect, same as in the invention as set forth in the other aspects, if there is no correlation in the color signal between lines, absence of correlation can be detected at high precision, and in the absence of correlation to the chrominance signal obtained through a conventional comb filter circuit, the chrominance signal is passed into the band pass filter circuit of narrow band, and the cross color interference on the screen is reduced, and if the correlation is high, by passing into the band pass filter circuit of wide band, deterioration of transient characteristic of chrominance signal can be prevented.

EXEMPLARY EMBODIMENTS OF THE PRESENT INVENTION

Figure 1:
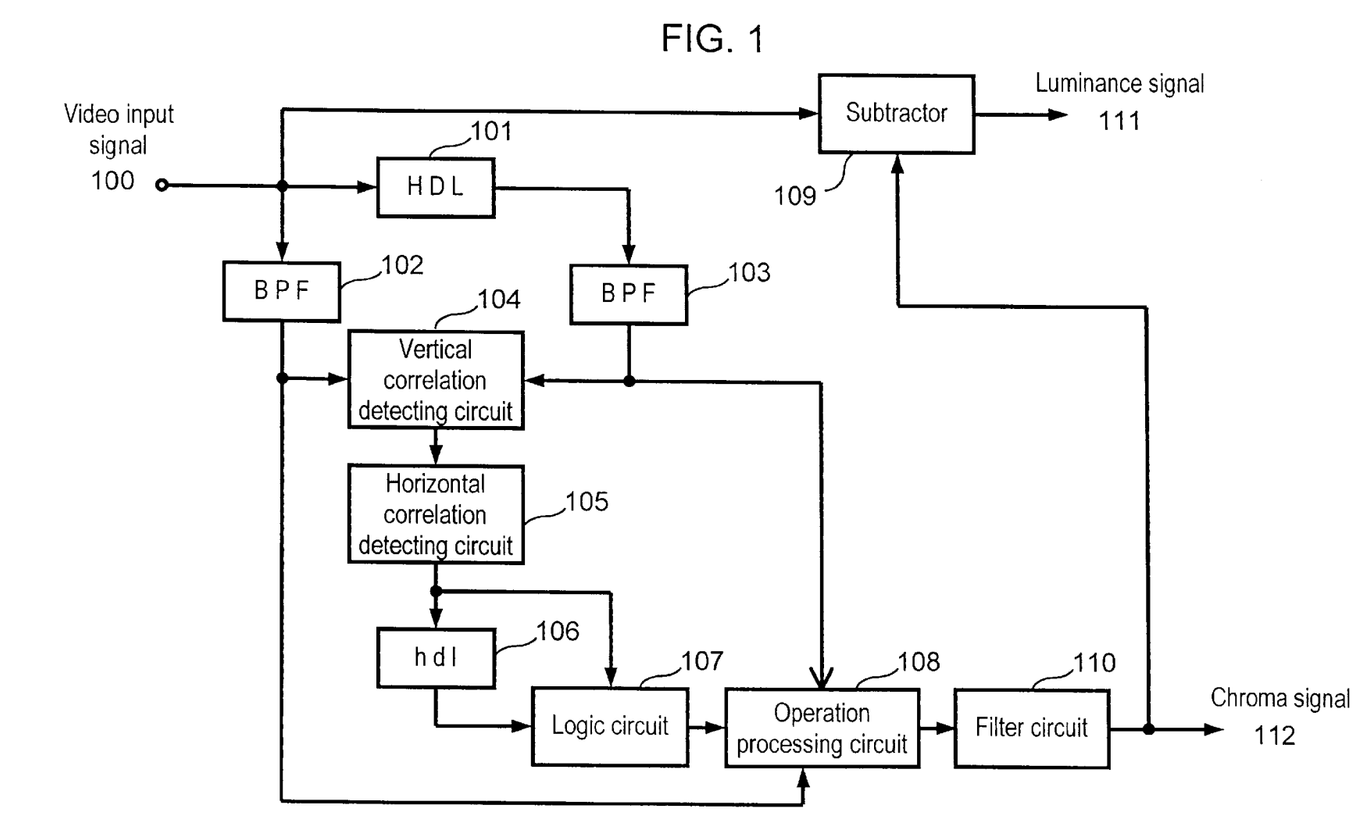
FIG. 1 is a block diagram of a signal processing circuit for separating a color video signal into a luminance signal and a chrominance signal in an example of embodiment 1 of the invention.

Referring now to the drawings, embodiments of the invention are described below. FIG. 1 is a block diagram of a signal processing circuit for Y/C separation showing a first embodiment of the invention.

In FIG. 1, when a video input signal 100 is fed in from an input terminal, it is supplied into a 1H delay circuit HDL 101, a BPF 102, and a subtractor 109. At this time, the signal passing through the HDL 101, that is, the video signal entered one horizontal scanning period before is supplied into a BPF 103. The output signal of the BPF 102 and the output signal of the BPF 103 are both supplied into a vertical correlation detecting circuit 104, and herein presence or absence of correlation of the two signals between lines is detected. For the ease of explanation of the operating function of the constituent elements shown in FIG. 1, an example of input of a known color bar signal is described below.

In the case of the color bar signal, the correlation of luminance signals is high between signals of a certain horizontal scanning line and a next scanning line, and the chrominance signals are mutually inverted in phase according to the principle of interleaving. Suppose the signal of the line having this color bar signal is entered as a present signal and is supplied into the BPF 102, then the signal one line before the present signal passes through the HDL 101, and is supplied into the BPF 103. Therefore, the signals obtained from the BPF 102 and 103 are composed of higher frequency components of luminance signals (staircase waves) and chrominance signals mutually inverted in phase. The both signals are fed into the vertical correlation detecting circuit 104, and are detected for presence or absence of correlation between lines. In the case of the color bar signal, the detection signals (H) of correlation presence are successively issued, and the signals are sequentially transmitted to the horizontal correlation detecting circuit 105.

The horizontal correlation detecting circuit 105 is a circuit for detecting the correlation between a signal at a certain point on a horizontal scanning line, and a signal remote by the time of N (for example, N=4) times of the half wavelength of the color subcarrier signal. In the case of color bar signal, signals having high correlation continue, and the output signals of the horizontal correlation detecting circuit 105 are also continuous detection signals (H) of correlation presence.

The output signal of the horizontal correlation detecting circuit 105 is supplied into a 1H delay circuit hdl 106 and a logic circuit 107. In the logic circuit 107, the output signal of hdl 106 is also supplied, and the logic operation (gating) is performed between the output signals from the horizontal correlation detecting circuit before and after one horizontal scanning period. Depending on the result, as shown in FIG. 5, processing in an operation processing circuit 108 is selected.

Figure 5:
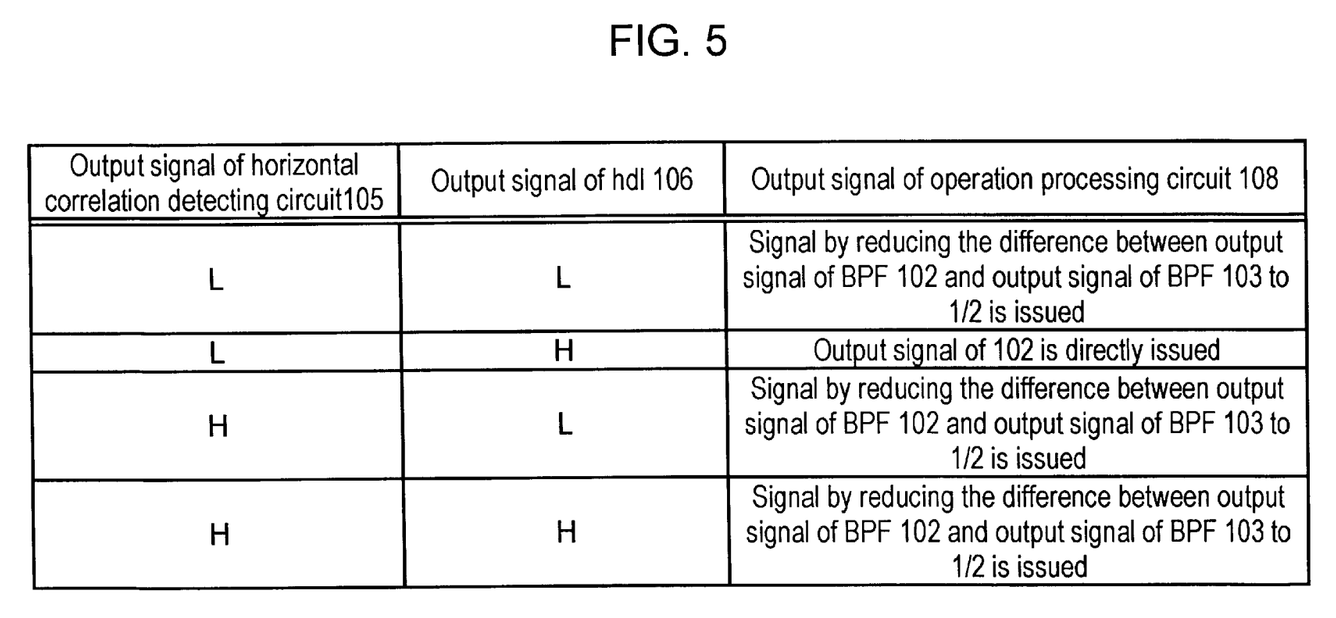
FIG. 5 is a table showing processing method of operation processing circuit in the block diagram of the example shown in FIG. 1.

In the color bar signal, the horizontal correlation detection signal continues to be the value of H for the period of nearly one line, and if the signal from next line is entered, the value is similarly H, so that the output signal by processing in the lowest stage in FIG. 5 is obtained from the operation processing circuit 108. That is, in this case, subtraction is performed between the signals supplied from the BPF 102 and 103. Therefore, the higher frequency components of the luminance signal are canceled to be nil, but the chrominance signals are mutually inverted in phase, and the amplitude is doubled as a result, and by reducing to ½ and issuing, a chrominance signal 112 of specified amplitude is obtained.

Thus obtained chrominance signal is supplied into a subtractor 109. In the subtractor 109, the video input signal 100 is supplied, and as the chrominance signal is subtracted from this composite color video signal, a luminance signal 111 is obtained.

Figure 2:
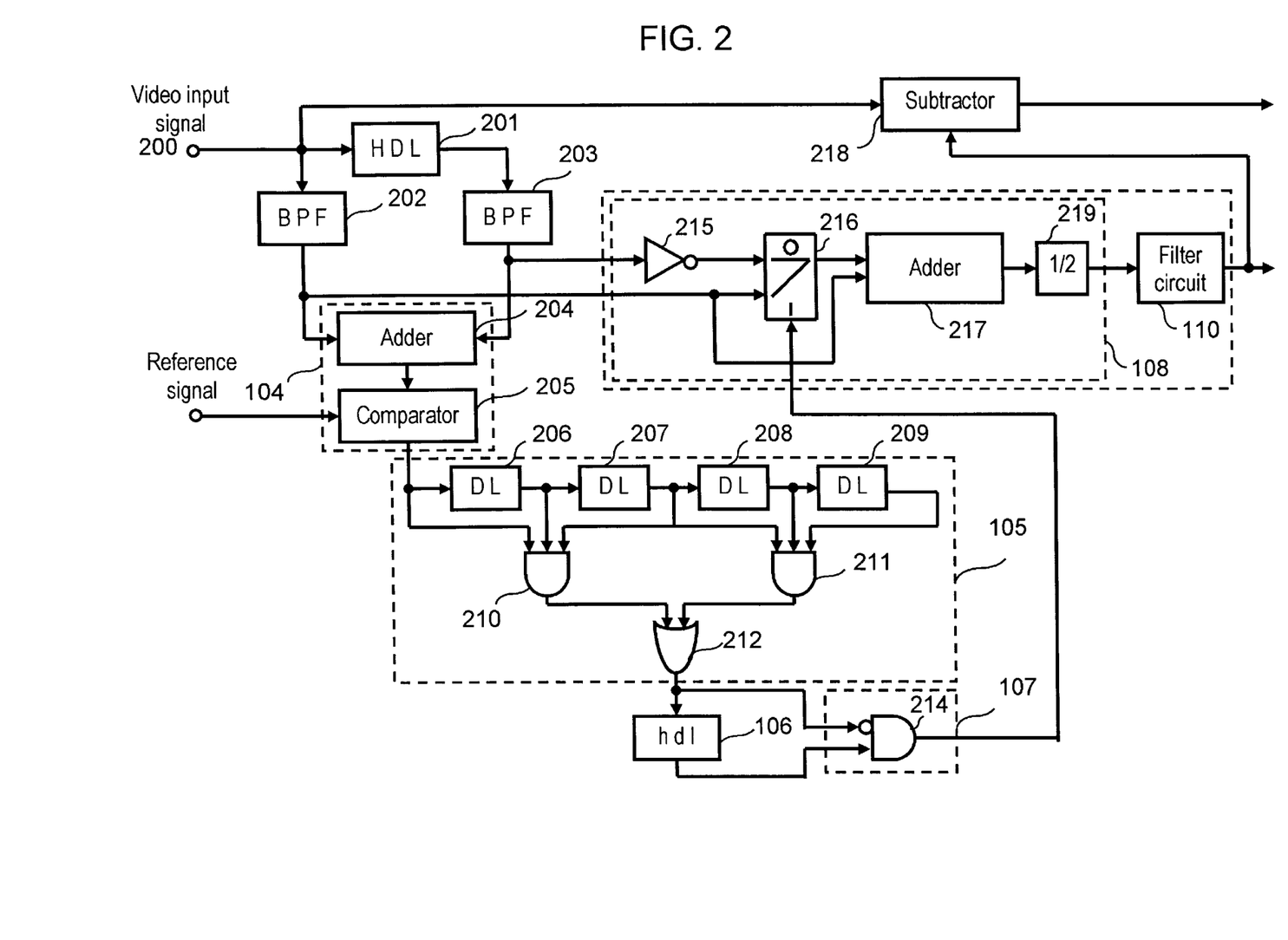
FIG. 2 is a block diagram showing a specific circuit of the example shown in FIG. 1.

FIG. 2 shows a further specific example of embodiment 1 of the invention. The operating function of the constituent elements in FIG. 2 is described below by referring to an example of input of color bar signal same as in the explanation of FIG. 1.

Same as in FIG. 1, an entered composite color video signal is supplied into a one-horizontal period (1H) delay circuit HDL 201, a band pass filter BPF 202, and a subtractor 218. Therefore, same as in the explanation of FIG. 1, in the case of a color bar signal, the signals delivered from the BPF 202 and BPF 203 are composed of higher frequency components of luminance signals equal in amplitude, and chrominance signals mutually inverted in phase but equal in amplitude.

The both output signals are fed into an adder 204, and are summed up. As a result of summing up, the chrominance signals are canceled because they are equal in amplitude and are inverted in phase, and only the higher frequency components of luminance signals are left over. That is, having no chrominance signal, a signal of small amplitude is the output signal of the adder 204.

The output signal of the adder 204 is supplied into a comparator 205, and is compared with a reference signal about amplitude. In this case, the amplitude of the output signal of the adder 204 is smaller than that of the reference signal. Herein, the output signal of the comparator 205 is set to issue an output of H when the reference signal is larger as a result of comparison, and output of L when smaller. Therefore, the output signal of the adder 205 is H, and the value of H continues in the case of color bar signal.

The output signal of the comparator 205 thus continuous to be the value of H is sequentially passed into delay circuits DL 206, DL 207, DL 208, and DL 209 for delaying the signal by the time corresponding to half wavelength of color subcarrier as shown in the drawing. The output signals of the comparator 205 and delay circuits DL 206, DL 207 are applied respectively into input terminals of a three-input AND gate circuit 210. Similarly, the output signals of the delay circuits DL 207, DL 208, and DL 209 are applied to input terminals of a three-input AND gate circuit 211.

As described above, in the case of color bar signal, since the output signal of the comparator 205 continues to be the value of H, the output signals obtained by passing this signal through DL 206, DL 207, DL 208, and DL 209 also continue to be the value of H. Therefore, the output signal of the AND gate circuit 210 receiving the output signals of the comparator 205 and DL 206, DL 207 is also the value of H.

Similarly, the output signal of the AND gate circuit 211 receiving the output signals of the DL 207, DL 208, and DL 209 is also the value of H. The output signal of an OR gate circuit 212 receiving the output signals of the both AND gate circuits as input signals as shown in the diagram is also the value of H. Having a correlation to the input signal of next line, the value of the output signal of each constituent elements after the comparator is H, and hence the output signal of the OR gate circuit 212 is also the value of H.

Consequently, a signal one line before obtained by passing the output signal of the OR gate circuit 212 through a 1H delay circuit hdl 106 is added to one input terminal of an AND gate circuit 214, and the output signal of the OR gate circuit 212 not passing through hdl 106 is added to other input terminal of negative logic of the AND gate circuit 214 as shown in the diagram, and the AND (logical operation) of the two input signals is calculated.

The output signal of the OR gate circuit 212 and the signal one (horizontal scanning) line before passing through hdl 106 are both H, but since the former is entered into the input terminal of negative logic, the output signal of the AND gate circuit 214 is a value of L (zero; 0). This output signal is fed into a switch circuit 216.

The switch circuit 216 is controlled of changeover action by the output signal from the AND gate 214, and when the output signal is L (0) as in this case, a signal obtained by inverting the phase of the output signal of the BPF 203 by a phase inverting circuit 215 is issued as an output signal, and in the case of H (1), the output signal of the BPF 202 is directly issued. Therefore, since the output signal of the AND gate circuit 214 is L (0), a signal obtained by inverting the phase of the output signal of the BPF 203 is obtained from the switch circuit 216 as output signal, and is supplied into an adder 217.

At other input terminal of the adder 217, the output signal of the BPF 202 is directly supplied, and both input signals are summed up. The signal entered from the switch circuit 216 is a signal one line before the other input signal, and is inverted in phase, and therefore, in the case of a color bar signal, as a result of summing up, the luminance signals are canceled, and the chrominance signals are summed up and obtained as a double amplitude. Herein, by reducing the amplitude to half (½) in an amplitude adjusting circuit 219, a chrominance signal of desired amplitude is obtained.

Thus obtained chrominance signal is supplied into a subtractor 218. In the subtractor 218, a video input signal 200 having a chrominance signal superposed on a luminance signal is supplied, and only the chrominance signal is subtracted, and a luminance signal only is taken out as an output signal of the subtractor 218.

In the case of signals having no correlation between lines, the operating function in embodiment 1 is explained by referring to an example in FIG. 2.

An example having no correlation between lines is explained by referring to signals as shown in FIG. 3(*a*). FIG. 3(*a*) shows waveforms sequentially showing signals in a part of the screen in the sequence of horizontal scanning lines, in which the luminance signal has a uniform level without change, and the chrominance signal has a single color in the upper part of the screen and is colorless in the lower half, and the signal in such screen are sequentially shown from the top in the sequence of horizontal scanning lines. That is, the chrominance signal is superposed in the upper three stages, and from the fourth stage and below, there is no chrominance signal, and only the luminance signal is present. It is hence evident that there is no correlation between the third stage signal and fourth stage signal.

Suppose such signal to be the input video signal 200 in FIG. 2, when the signal in any one of the upper three stages is entered, in the case of an input of color bar signal, it is evident that the operation is same as in the operating function explained in the example in FIG. 2. Hence, a case of input of a fourth stage signal is explained.

The fourth stage signal is a luminance signal of a constant level (direct-current component) without chrominance signal, and when this signal is entered in the band pass filter BPF 202 as video input signal, the signal is cut off, and does not pass (regarded as zero). Therefore, the input signal into the adder 204 is only the output signal (chrominance signal) obtained by supply of signal one line before (third stage) into the BPF 203. As explained in the example of color bar signal, if there is a correlation between signals before and after one horizontal scanning period, the chrominance signals entered from the BPF 202 and BPF 203 entered in the adder 204 cancel each other, whereas, in this case (between third stage signal and fourth stage signal), the chrominance signal entered from the BPF 203 is directly issued, and therefore the output signal of the adder 204 is large in amplitude, and it is compared with a reference signal in the comparator 205. As a result of comparison, since the reference signal is smaller, the value of L is issued as output signal. This value of L continues as long as the video input signal 200 is the fourth stage signal.

In this period, therefore, the output signal of the comparator 205 and the output signals of the delay circuits DL 206, 207, 208, 209 are values of L, and the output signals of the AND gate circuits 210, 211 and OR gate circuit 212 are also values of L. The output signal of the OR gate circuit 212 is entered into the input terminal side of negative logic of the two-input AND gate circuit 214 as shown in the diagram, and the input signal from hdl 106 supplied into other input terminal is a signal one horizontal scanning period before (third stage), and is a value of H, and hence the output signal of the AND gate circuit 214 is a value of H (1).

The output signal of the AND gate circuit 214 controls changeover action of the switch circuit 216. Since this output signal is a value of H (1), the output signal of the BPF 202 is obtained as an output signal of the switch circuit 216, and is supplied into one input terminal of the adder 217.

In other input terminal of the adder 217, as shown in the diagram, the output signal of the BPF 202 is directly supplied without passing through the switch circuit, and in the adder 217, the output signal from the same BPF 202 is added, so that the value is doubled. Therefore, by reducing the amplitude of the output signal of the adder 202 to half (½) in the amplitude adjusting circuit, a chrominance signal of a required amplitude is obtained. This chrominance signal is supplied into the subtractor 218 same as mentioned above, and a signal corresponding to the chrominance signal is subtracted from the video input signal 200, and a luminance signal is obtained as the output signal of the subtractor 218. In the example of the fourth stage signal as video input signal, since chrominance signal is not superposed, it is evident that chrominance signal is not issued.

The operating function of each constituent elements in the example in FIG. 2 is explained so far in relation to an example of input of signal having no correlation between lines as shown in the third stage and fourth stage in FIG. 3(*a*), and FIG. 3(*b*) shows a waveform (solid line) of output signal of comparator 205. The output signal waveform of the comparator 205 in the case of input of video input signal of second stage from the top in FIG. 3(a) is shown in the highest stage in FIG. 3(b), and the subsequent lines are shown sequentially. Similarly, corresponding to the line sequence, FIG. 3(c) shows the waveform of output signal of OR circuit 212, FIG. 3(d) shows the waveform of output signal of amplitude adjusting circuit 219 or chrominance signal extracting circuit 220, and FIG. 3(e) shows the output signal waveform of subtractor 218.

According to the embodiment of the invention, as described herein, absence of correlation of signals between lines can be detected at high precision, and signal processing for separating into luminance signal and chrominance signal can be done accurately, so that the problems in the prior art can be solved.

In particular, as mentioned in the problems of the prior art, since two delay circuits of one horizontal scanning period for video signal are used for enhancing the precision of correlation detection, the cost is increased, but in the invention, as clear from the description of the example in FIG. 2, since the value of the signal processed from the comparator 205 until reaching the output signal of the AND gate circuit 214 is a binary value of either H (1) or L (0), the delay circuit hdl 106 of one horizontal scanning period can be realized by a very simple circuit element as compared with the delay circuit for color video signal such as HDL 201. Therefore, as compared with the prior art of enhancing the precision of correlation detection by using two delay circuits for color video signal, signal processing of high precision is realized at lower cost.

Embodiment 2 of the invention is described below. In a prior art, the chrominance signal obtained from the comb filter circuit is passed a narrow band pass filter circuit for purpose of reducing the cross color interference occurring in the absence of correlation of signals between lines. Hence, the transient characteristics of the chrominance signal is impaired, even if there is high correlation of signals between lines.

Figure 4:
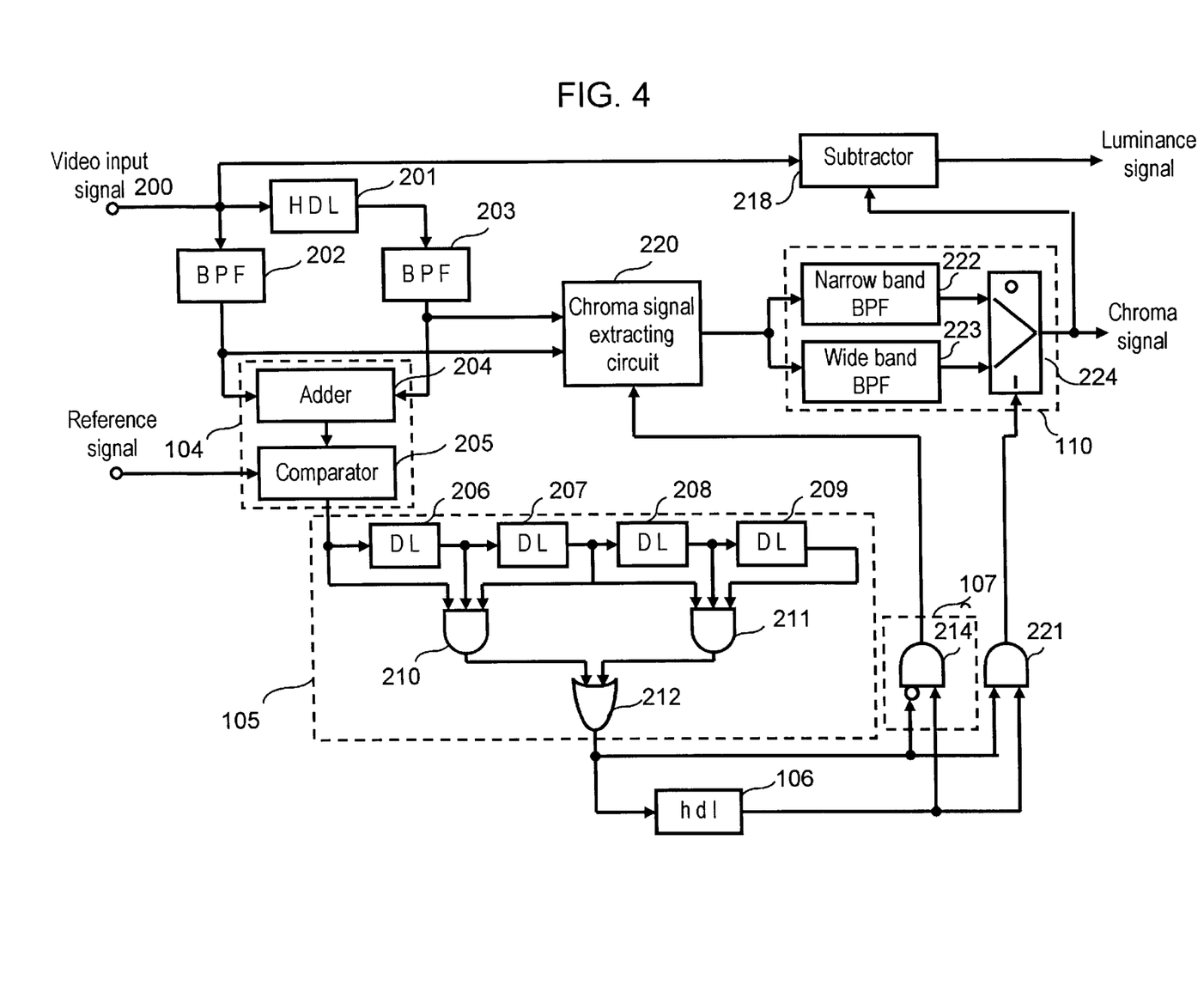
FIG. 4 is a block diagram of an example of embodiment 2 of the invention.

It is intended to solve the above problem in the embodiment 2 of the invention. As an example, a signal processing circuit for Y/C separation is shown in a block diagram in FIG. 4. In FIG. 4, constituent elements common to those in FIG. 2 are identified with same reference numerals, and their operating functions are also same as explained in FIG. 2, and hence their description is omitted or simplified.

In FIG. 4, other constituent elements than AND gate circuit 221, narrow band pass filter circuit BPF 222, wide band pass filter circuit 223, and switch circuit 224 are coupled same as constituent elements in FIG. 2, and their operating functions are the same, so that input and output signals are also same. Therefore, when a signal high in correlation between lines such as the color bar signal explained in FIG. 2 is entered as video input signal 202, according to the same operating function as in FIG. 2, the output signals of the OR gate circuit 212 and 1H delay circuit hdl 106 are values of H (1).

The output signals of the OR gate circuit 212 and 1H delay circuit hdl 106 are supplied same as in FIG. 2, that is, the former output signal is supplied into the input terminal of negative logic of the two-input AND gate circuit 214, and the latter is directly supplied into other input terminals, and they are also connected respectively to the AND gate circuit (logical product circuit) 221 having two input terminals of positive logic.

When the video input signal is a signal of high correlation, since the values of output signals of OR gate circuit 212 and 1H delay circuit 106 are H (1), the output signal of the AND gate circuit 214 is L (0) as explained in the example in FIG. 2, and is supplied into the chrominance signal extracting circuit 220, while the output signal of the AND gate circuit 221 becomes H (1), and is supplied into the switch circuit 224.

As explained in the example in FIG. 2, by the output signal of L (0) supplied from the AND gate circuit 214, the chrominance signal passing through the comb line filter and delivered from the chrominance signal extracting circuit 220 is supplied into the switch circuit 224 through the narrow band BPF 222 and wide band BPF 223 in FIG. 4. The switch circuit 224 is controlled of switching function by the output signal of the AND gate circuit 221, and in the case of a signal high in correlation between lines, since the output signal of the AND gate circuit 221 is H (1), the chrominance signal passing through the wide band BPF 223 is the output signal as shown in the diagram.

Therefore, as the required chrominance output signal, a signal passing through the wide band pass filter circuit excellent in transient characteristic is obtained, and the problems of the prior art can be solved.

Figure 3A:
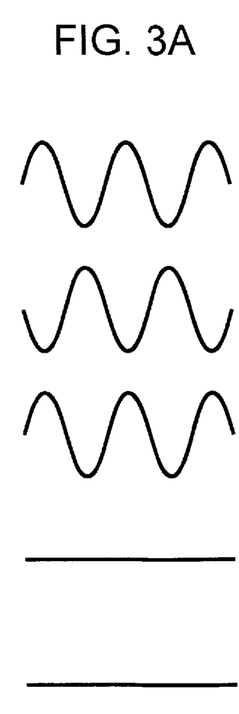
FIG. 3(a) to FIG. 3(e) are parts of signal waveforms shown in the scanning line sequence for explaining the operating function of constituent elements in the case of input of signal free from correlation between lines in the example shown in FIG. 2.
Figure 3B:
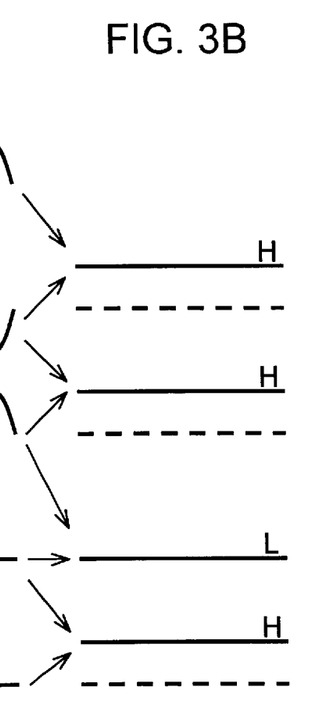
Figure 3C:
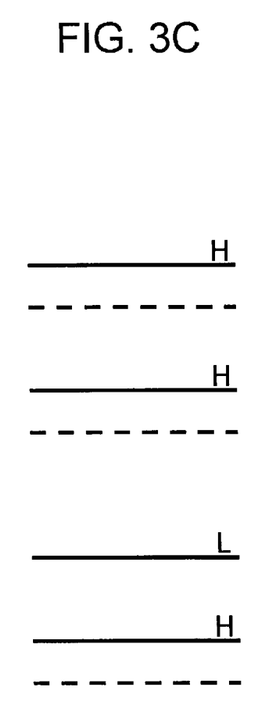
Figure 3D:
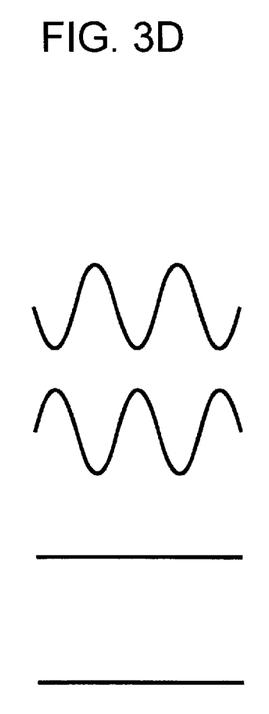
Figure 3E:
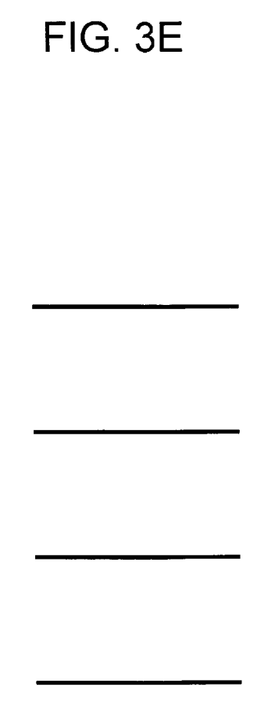

As an example of video input signal free from correlation between lines, the operation of constituent elements in the example in FIG. 2 is explained by using the signal as shown in FIG. 3(a), and it can be also applied in the explanation of operating function in the example in FIG. 4. That is, since there is no correlation between lines between the third stage signal and four stage signal from the top in FIG. 3(a), when the fourth stage signal is entered as video input signal, the output signal of the OR gate circuit 212 is L as explained above, whereas the output signal of the 1H delay circuit hdl 106 is a value of H. Therefore, the value of the output signal of the AND gate circuit 214 is L (0), whereas the value of the output signal of the AND gate circuit 221 is L (0).

Since the output signal of the AND gate circuit 221 is a value of L (0), the output signal of the chrominance extracting circuit 220, passing through the narrow band BPF 222, is selected by the switch circuit 224 and is taken out as required chrominance signal. Thus, in the absence of correlation between lines, the effect of comb line filter is not exhibited, and the mixed luminance signal component is decreased by the narrow band pass filter circuit, so that the cross color interference can be lessened.

In the example shown in FIG. 4 for explaining embodiment 2 of the invention, constituent elements common to the chrominance signal extracting circuit in FIG. 2 explained in embodiment 1 are shown in the chrominance signal extracting circuit 220, and the operating function is explained, and instead of the chrominance signal obtained from this chrominance signal extracting circuit 220, for example, in embodiment 2, the chrominance signal taken out from the conventional comb filter circuit may be supplied into the narrow band BPF 22 and wide band BPF 223.

INDUSTRIAL APPLICABILITY

Thus, according to the invention, absence of correlation in signals between lines can be detected at high precision, and the signal processing for separating into luminance signal and chrominance signal can be executed adequately, so that a signal processing circuit solving the problems in the prior art can be presented. In particular, as compared with the method of enhancing the precision of detection of correlation by using two 1H delay circuits for color video signal as in the prior art, signal processing of high precision can be realized at a lower cost, because of using a 1H delay circuit for color video signal and a simple 1H delay circuit for binary data. Besides, as for color video signal high in the correlation between lines, a chrominance signal excellent in transient characteristic can be obtained, and as for a signal low in correlation, the cross color interference can be lessened, according to the signal processing circuit presented herein.

What is claimed is:

1. A luminance signal and chrominance signal separating circuit comprising.
   a first band pass filter for obtaining a first signal by passing a predetermined band width of a color video signal,
   a first 1H delay circuit for delaying said color video signal by one horizontal scanning period,
   a second band pass filter for obtaining a second signal by receiving the output signal from said first 1H delay circuit and passing said predetermined band width of the delayed color signal, thereby taking out a chrominance signal from said first signal and second signal;
   a correlation detecting circuit for detecting the correlation between said first signal and second signal, said correlation detecting circuit having a vertical correlation detecting circuit for detecting the vertical correlation of said first signal and second signal; and a horizontal correlation detecting circuit for receiving an output signal from said vertical correlation detecting circuit, and for detecting the correlation in the horizontal scanning period of the entered signal
   a second 1H delay circuit for delaying an output signal from said correlation detecting circuit by one horizontal scanning period;
   a first logic circuit for receiving the output signal from said correlation detecting circuit and the output signal from said second 1H delay circuit, and performing a logical operation; and
   an operation processing circuit for receiving said first signal and second signal, and taking out a chrominance signal from the difference between said first signal and second signal or from the first signal only, depending on an output signal of said first logic circuit.

2. A luminance signal and chrominance signal separating circuit of claim 1, wherein said vertical correlation detecting circuit comprises:
   a first adder for summing up said first signal and second signal; and
   a comparator for comparing the output signal of said first adder and a reference signal, and outputting the result of comparison.

3. A luminance signal and chrominance signal separating circuit of claim 1, wherein said horizontal correlation detecting circuit determines horizontal correlation when the output from said vertical correlation circuit changed by time $T_L$ corresponds to half the wavelength of the color subcarrier.

4. A luminance signal and chrominance signal separating circuit of claim 3, being characterized in that said horizontal correlation detecting circuit comprises:
   a first delay circuit for receiving the output signal from said vertical correlation detecting circuit, and delaying by said time $T_L$;
   a second to m-th delay circuit and a (m+1)-th to n-th delay circuit connected to said first delay circuit in series for delaying the output signal of delay circuit by said time $T_L$, respectively;
   a first multi-input AND gate circuit for receiving the output signals of said first delay circuit to m-th delay circuit;
   a second multi-input AND gate circuit for receiving the output signals of said (m+1)-th to n-th delay circuit; and
   an OR gate circuit for receiving the output signal of said first multi-input AND gate circuit and the output signal of said second multi-input AND gate circuit.

5. A luminance signal and chrominance signal separating circuit comprising:
   a first band pass filter for obtaining a first signal by passing a predetermined band width of a color video signal,
   a first 1H delay circuit for delaying said color video signal by one horizontal scanning period,
   a second band pass filter for obtaining a second signal by receiving the output signal from said first 1H delay circuit and passing said predetermined band width of the delayed color signal, thereby taking out a chrominance signal from said first signal and second signal;
   a correlation detecting circuit for detecting the correlation between said first signal and second signal;
   a second 1H delay circuit for delaying an output signal from said correlation detecting circuit by one horizontal scanning period;
   a first logic circuit for receiving the output signal from said correlation detecting circuit and the output signal from said second 1H delay circuit, and performing a logical operation;
   an operation processing circuit for receiving said first signal and second signal, and taking out a chrominance signal from the difference between said first signal and second signal or from the first signal only, depending on an output signal of said first logic circuit;
   a second logic circuit for receiving the output signal from said correlation detecting circuit and the output signal from said second 1H delay circuit, and performing a logical operation; and
   a variable filter for receiving the output signal from said operation processing circuit and changing over the band passing characteristic depending on the output signal of said second logic circuit.

6. A luminance signal and chrominance signal separating circuit of claim 5, wherein said variable filter comprises:
   a band pass filter of narrow band;
   a band pass filter of wide band having a wider band than the narrow band; and
   a second changeover circuit for changing over and issuing either one of the output signal of said band pass filter of narrow band or the output signal of said band pass filter of wider band, depending on the output signal of said second logic circuit.

7. A luminance signal and chrominance signal separating circuit comprising:
   a first band pass filter for obtaining a first signal by passing a predetermined band width of a color video signal,
   a first 1H delay circuit for delaying said color video signal by one horizontal scanning period,
   a second band pass filter for obtaining a second signal by receiving the output signal from said first 1H delay circuit and passing said predetermined band width of the delayed color signal, thereby taking out a chrominance signal from said first signal and second signal;
   a correlation detecting circuit for detecting the correlation between said first signal and second signal;

a second 1H delay circuit for delaying an output signal from said correlation detecting circuit by one horizontal scanning period;

a first logic circuit for receiving the output signal from said correlation detecting circuit and the output signal from said second 1H delay circuit, and performing a logical operation;

an operation processing circuit for receiving said first signal and second signal, and taking out a chrominance signal from the difference between said first signal and second signal or from the first signal only, depending on an output signal of said first logic circuit;

a phase inverting circuit for inverting the phase of output signal of said second band pass filter;

a first changeover circuit for receiving the output signal of said phase inverting circuit and the output signal of said first band pass filter as input signals, and selecting and taking out either signal of said input signals by the output of said first logic circuit;

a second adder for adding the output signal from said first changeover circuit and the output signal from said first band pass filter; and an amplitude adjusting circuit for reducing the output signal of said second adder circuit to ½.

8. A luminance signal and chrominance signal separating circuit comprising:

a first band pass filter for obtaining a first signal by passing a predetermined band width of a color video signal, a first 1H delay circuit for delaying said color video signal by one horizontal scanning period, a second band pass filter for obtaining a second signal by receiving the output signal from said first 1H delay circuit and passing said predetermined band width of the delayed color signal, thereby taking out a chrominance signal from said first signal and second signal;

a correlation detecting circuit for detecting the correlation between said first signal and second signal;

a second 1H delay circuit for delaying an output signal from said correlation detecting circuit by one horizontal scanning period;

a first logic circuit for receiving the output signal from said correlation detecting circuit and the output signal from said second 1H delay circuit, and performing a logical operation;

an operation processing circuit for receiving said first signal and second signal, and taking out a chrominance signal from the difference between said first signal and second signal or from the first signal only, depending on an output signal of said first logic circuit;

said first logic circuit is formed of an AND gate circuit having an input terminal of negative logic at a first end and an ordinary input terminal of positive logic at a second end, and the output signal of said correlation detecting circuit is supplied into said input terminal of negative logic, and the output of said second 1H delay circuit is supplied into the input terminal of positive logic.

* * * * *